Jan. 22, 1957 L. E. NORTON 2,778,938

CONTROLLED FREQUENCY MICROWAVE GENERATION

Filed April 27, 1953 2 Sheets-Sheet 1

INVENTOR.
LOWELL E. NORTON

BY Milton S. Winters
ATTORNEY

Jan. 22, 1957 L. E. NORTON 2,778,938

CONTROLLED FREQUENCY MICROWAVE GENERATION

Filed April 27, 1953 2 Sheets-Sheet 2

INVENTOR.
LOWELL E. NORTON

BY Milton S. Winters

ATTORNEY

United States Patent Office 2,778,938 Patented Jan. 22, 1957

2,778,938

CONTROLLED FREQUENCY MICROWAVE GENERATION

Lowell E. Norton, Princeton, N. J., assignor to Radio Corporation of America, a corporation of Delaware Application April 27, 1953, Serial No. 351,182

13 Claims. (Cl. 250—36)

The present invention is directed to the generation of microwave electromagnetic energy.

It is known to generate microwave electromagnetic energy in an oscillator, and to control the frequency of the oscillator by means of a gas cell. The gas cell depends for its operation on the phenomenon of gas molecular resonance. The effective Q of such a gas cell is extremely high. Therefore, the microwave energy may be controlled in frequency with great accuracy.

In order to provide still higher effective Q, a reduced spectral line bandwidth of the gas at the resonant frequency is employed. The bandwidth contribution due to intermolecular collisions may be reduced by pressure reduction, while that due to molecule-wall collisions may be decreased by increasing the gas container dimensions. Neither measure leads to any greatly reduced bandwidth because the Doppler contribution to total bandwidth remains unchanged, and large compared to the other contributions. One way to reduce the Doppler line broadening is to use a Dicke-Newell gas cell. Briefly, this gas cell employs a plurality of grids (or other structure) for producing a periodic time and spatial modulating field. Such cells are disclosed in the co-pending application of Robert H. Dicke and George S. Newell, Jr., Serial No. 243,082, filed August 22, 1951, entitled "Molecular Resonance System and Method." In the operation of the Dicke-Newell gas cell, it is preferred to use a field modulation oscillator. Then microwave energy incident on or applied to the cell at a frequency above (or below) the unperturbed or undisturbed gas resonance by half the modulating frequency causes a coherent re-radiation or reflection from the gas of the cell in constructive fashion. The re-radiated or reflected energy may be readily separated from the incident energy because such reflected energy is below if the incident energy is above (or above if the incident energy is below) the undisturbed gas resonance frequency by half the modulating frequency. Moreover, this reflected energy itself has the characteristics, such as anomalous dispersion, of a gas resonance or spectral line except that it is displaced in frequency from the undisturbed gas resonance by minus (or plus) half the modulating frequency.

Due to the displacement, however, systems of frequency control employing the Dicke-Newell gas cell and a modulating oscillator usually require a microwave oscillator or generator having a voltage responsive frequency control element so that an off-set output frequency may be derived by some form of servo frequency control. Also, such systems usually require phase detectors or the like, which are often difficult to provide with the required degree of sensitivity to take full advantage of the effective high Q of the system. Reference may be made to the said application of Dicke-Newell and also to my copending application, Serial No. 338,062, filed February 20, 1953, entitled Gas Cell Frequency Control, for examples of prior systems of frequency control.

It is an object of the present invention to provide a novel microwave generator and a novel method of microwave generation employing a Dicke-Newell gas cell as a frequency controlling element.

Another object of the invention is to simplify a microwave generator of the type employing a Dicke-Newell gas cell for frequency control, and to simplify the method of generating oscillations frequency controlled by such a cell.

A further object of the invention is to produce a stabilized frequency using a Dicke-Newell gas cell with reduced Doppler bandwidth, by feedback amplification, without the necessity of using a separate microwave oscillator or generator.

Another object of the invention is to provide a novel microwave generator using feedback amplification, and controlled in frequency by a Dicke-Newell gas cell, without the necessity of having a separate microwave generator with a voltage responsive frequency control element.

In accordance with the invention there are provided a Dicke-Newell gas cell, a modulation oscillator for applying the modulating energy thereto, and a feedback path for the reflected energy from the gas cell output to its input. This path includes a mixer to mix energy from the modulation oscillator with energy reflected from the gas cell. The mixed energy includes an excitation component at the proper frequency, displaced by half the modulation frequency from the undisturbed gas resonance line, to provide a coherent reflection from the gas cell at another frequency displaced by a like amount from the undisturbed gas resonance. Only at a proper frequency will the reflected energy be coherent. At other frequencies, the gas cell reflections are destructive. Hence only at the proper frequencies can oscillations be sustained. Moreover, the generated oscillations are frequency controlled to a high degree because of the high effective Q of the Dicke-Newell gas cell, that is, by the narrowness of the line reflected from the gas cell.

The foregoing and other objects, advantages, and novel features of the invention will be more fully apparent from the following description when taken in connection with the accompanying drawing, in which like reference numerals apply to similar parts, and in which.

Figures 1, 2:
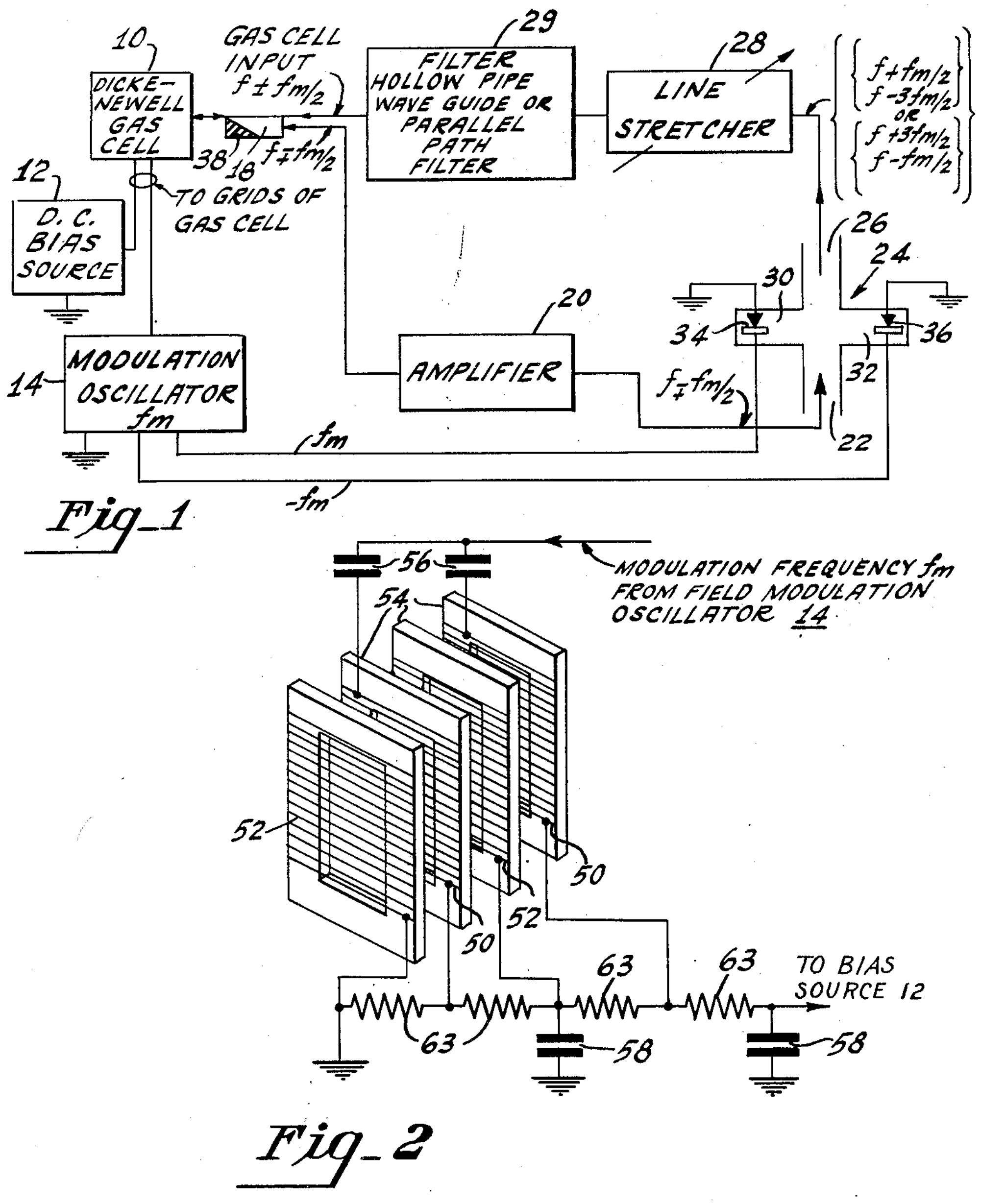
Fig. 1 is a circuit diagram schematically illustrating one embodiment of the invention.
Fig. 2 is a perspective view, schematically illustrating the internal arrangement of the grids of one kind of Dicke-Newell gas cell which may be employed in the embodiment of Fig. 1.
Figures 3A, 3B, 4:
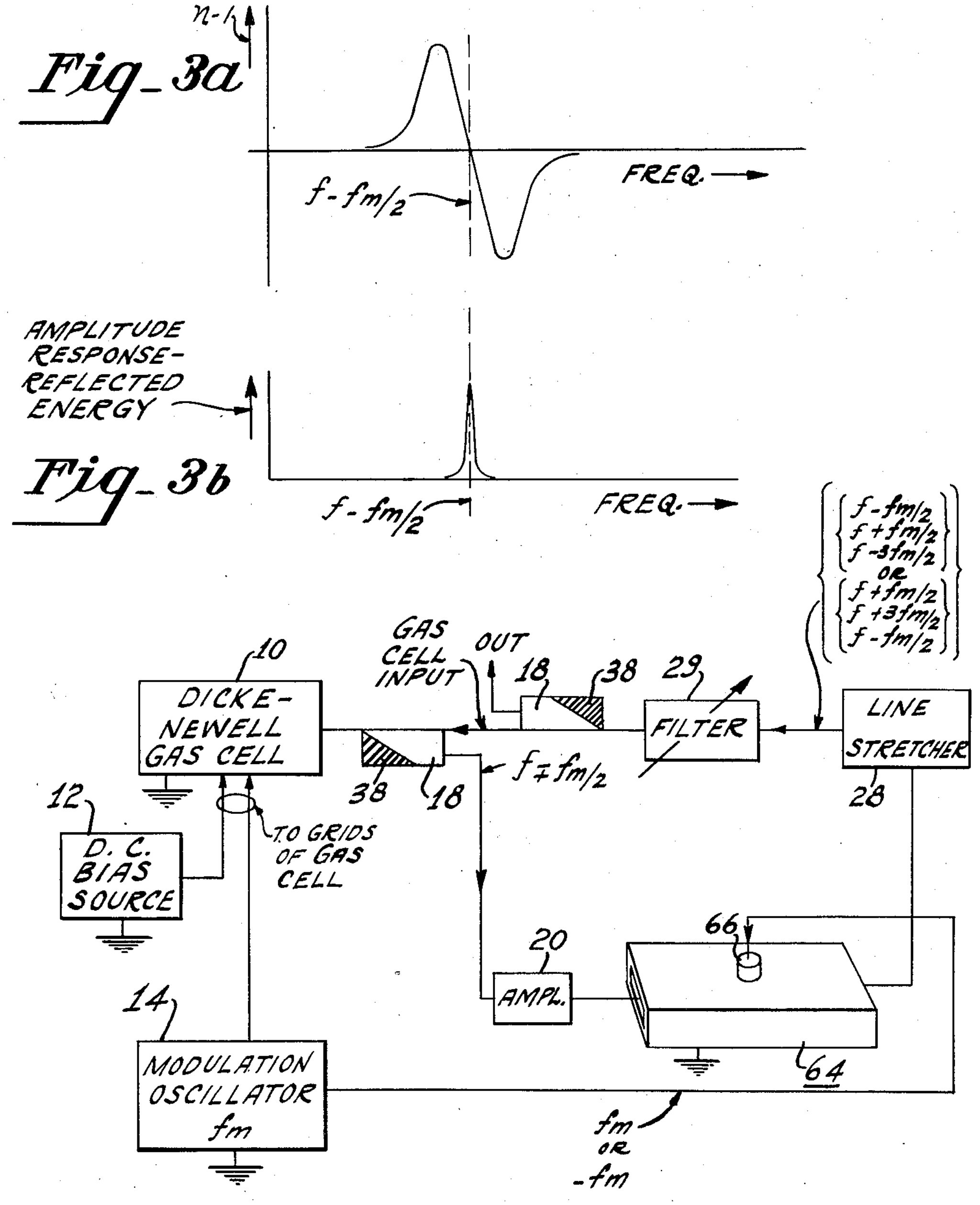

Figs. 3*a* and 3*b* are, respectively, a simplified plot of the dispersion characteristic, that is a plot of $n-1$ against frequency where $n$ is the index of refraction of energy reflected from the gas cell of Fig. 2, and a plot of the amplitude response of energy reflected by the gas of the cell of Fig. 2;

Fig. 4 is a circuit diagram schematically illustrating another embodiment of the invention using a different mixer from that of Fig. 1.

Referring to Fig. 1, a Dicke-Newell gas cell 10 is of the type having grids. A D. C. (direct current) source 12 provides bias to the grids. A modulation oscillator 14 applies energy at frequency $fm$ to the grids of gas cell 10. Microwave energy from a filter 29 is applied to the gas cell. This energy, incident on the gas cell, may be assumed of frequency $f \pm fm/2$ where $f$ is the undisturbed molecular resonance of the gas in gas cell 10. The energy reflected from gas cell 10, at frequency $f \mp fm/2$ (the usual convention is followed by which either all of the upper or all of the lower plus and minus signs are taken together) is recovered through a directional coupler 18. The reflected energy from coupler 18 may be amplified by an amplifier 20 and applied to one arm 22 of a first pair of arms of a waveguide "magic-T"

24. Energy from the other arm 26 of this first pair of arms is applied through a line stretcher 28 and filter 29 which applies its output as noted above, to the gas cell 10.

The second pair of arms 30 and 32 of "magic-T" 24 each is terminated in a short-circuit (closed metallic wall) and each has, at or near the termination, a crystal diode 34 in arm 30, and diode 36 in arm 32. The diodes are preferably matched to their respective waveguide sections. One electrode of each of the crystal diodes may be grounded to the wall of the waveguide arms 30, 32. The modulation oscillator 14 is connected to apply oppositely phased voltages to the crystal diodes 34, 36 indicated as $fm$, $-fm$ on the schematic connections. It will be understood that a common ground connection is employed, and that the connections indicated as carrying microwave frequencies ($f$, or $f+fm/2$ or $f-fm/2$) may be hollow pipe waveguide, if desired. The directional coupler 18 may be any suitable type, as a long slot in a common wall of two wave-guides. At the end of coupler 18 remote from the first amplifier 16, the coupler may be terminated in a matched energy absorbent termination 38 or load, as schematically indicated, to absorb energy coupled from first filter 29. The load may be dissipative or useful. Energy travelling back toward first filter 29 from the gas cell 10 is partially coupled to the amplifier 20.

The Dicke-Newell gas cell may be described as a gas cell having means for providing a field periodic in time and space. One form of the gas cell internal structure is illustrated in Fig. 2. Other forms of gas cell are disclosed in the above-identified application of Robert H. Dicke and George S. Newell, Jr. A series of planar grids, alternate ones indicated as 50 and 52, all with wires parallel to a predetermined direction (shown horizontal) are mounted on metallic frames 54. The grids are dielectrically spaced apart preferably at a quarter of the wavelength of the undisturbed gas molecular resonance frequency $f$. The modulation oscillation from the field modulation oscillator may be applied through blocking capacitors 56 to alternate grids 50. A D. C. bias voltage, if required, may be applied by tapping off a series of voltage dividing resistors 63. The capacitors 58 by-pass any radio frequency (microwave) voltages on the other alternate grids 52. The grids are enclosed in an envelope (not shown) filled with the desired gas at reduced pressure, thus to be immersed in the gas. The microwave energy is applied to travel in a direction normal to the plane of the grids 50, 52 and polarized with the electric vector normal to the grid wires, to allow passage of the energy without serious obstruction by the grids, as shown in said Dicke and Newell application. Under these conditions, reflections or re-radiation takes place from the molecules of the gas. At either frequency, $f \pm fm/2$ for the incident energy, the reflections are coherent or constructive. The phenomenon is due to the spatial periodic and time periodic field between the grids. The D. C. voltage or field between grids is used with some molecules, as $NH_3$, where the Stark shift is quadratic, and by virtue of the cross product term produces a desired linear frequency shift due to a Stark field, where otherwise the shift would be quadratic with applied field. If the shift of the gas frequency employed is linear with applied field, as with some gases, then the D. C. field may be omitted.

The time and spatial periodic fields give rise to two travelling Stark waves, either one of which may be employed. One wave travels in the direction of the incident microwave energy, and the other in the reverse. Due to the shift in resonant frequency of the gas in adjacent "laminations" enclosed by adjacent grids, and to the quarter wave thickness of each lamination, constructive reflections are received only from one velocity class of molecules moving in the direction (or the reverse) of the incident wave. Therefore, when the incident energy is $fm/2$ above the undisturbed gas resonance, molecules moving with the incident energy, due to Doppler shift, are resonated at $f$ referred to the moving molecules.

The reflected energy, due to Doppler shift, is reflected and received at frequency $f-fm/2$. The reflected line, like the gas resonance line, exhibits anomalous dispersion, as shown in Fig. 3a where $n$ is the index of refraction, and also a resonance line, as shown in Fig. 3b, only one resonance line being shown, namely that one occurring when the incident frequency passes through $f+fm/2$, giving rise to the line shown at $f-fm/2$. Another line at $f+fm/2$ resulting when the incident energy is at $f-fm/2$ is not shown. The term resonance line used in this sense is intended to be interpreted as the spectral distribution of energy in the coherent reflection.

For further details and a more complete explanation of the gas cell operation, reference may be made to the aforesaid copending application of Dicke and Newell.

Referring again to Fig. 1, there is a feedback path from the gas cell 10 through amplifier 20, magic T 24, and a line stretcher 28 back to the gas cell. The magic T 24, and crystal diodes 34, 36 are a known form of balanced modulator or mixer. The energy incident at arm 22 divides into the pair of arms 30 and 32, where there is mixing with the energy applied to the crystal diodes 34, 36. The short-circuited terminations of arms 30 and 32 returns in such phase as to be coupled into arm 26. The system may be adjusted so that the coherent reflection from the cell occurs at either frequency $f+fm/2$ or $f-fm/2$. If, for example, frequency $f+fm/2$ is chosen, then the magic T balanced modulator output frequencies are at $f+3fm/2$ and $f-fm/2$. The frequency component $f+fm/2$ is for practical purposes balanced out. The term at $f-fm/2$ passed by filter 29 will provide cell excitation to produce and sustain the cell coherent reflection at frequency $f+fm/2$. In similar fashion, if the operating frequency is chosen to be $f-fm/2$, then the magic T balanced modulator output will be at frequencies $f+fm/2$ and $f-3fm/2$. The term at $f+fm/2$ passed by filter 29 will produce and sustain the coherent reflection at frequency $f-fm/2$. If these components were applied, without selection, it is apparent that oscillations would be sustained, with energy applied from amplifier 16 at either one (or possibly both) of the two frequencies $f+fm/2$ and $f-fm/2$. For this reason the filter 29 is interposed in the feedback path to cut out one of the components $f-fm/2$ or $f+fm/2$.

A convenient form for filter 29 is a hollow pipe waveguide dimensioned to cut-off the frequency $f-fm/2$. A phase balance arrangement of two paths in parallel may alternatively be used. The two paths of the parallel path filter differ by a half wavelength $\lambda/2$ or some odd multiple thereof at the frequency to be suppressed.

Thus the frequency $f+fm/2$ is applied to the gas cell and the frequency $f-fm/2$ is reflected. Because of the narrowness of the reflected line, the sustained oscillations are extremely accurate in frequency. The frequency $f$ is determined by the natural resonance of the gas molecules, at a very high Q. The frequency may be, for example, 100 kilocycles for easy separation by the filter.

It may be noted that the same filter 29 may be employed even if it is desired to maintain the oscillations incident on the gas cell at $f-fm/2$ with the reflected line at $f+fm/2$, by inserting the filter 29 in the feed-back path between the gas cell output and the magic T 24 modulator, for example, between directional coupler 18 and second amplifier 20. The amplifier 20 may be inserted at any desired point in the feedback path. However, insertion immediately following the gas cell 10 is desirable because the signal level is low at this point, and if the signal is not there amplified, may drop near or below the noise level. Output may be taken for a utilization circuit at either component $f \pm fm/2$ from any suitable point on the feedback path, preferably following amplification and filtering.

Referring to Fig. 4, in the feedback path between the reflection output from the gas cell 10 to its input is a modulator or mixer 64 different from that of Fig. 1.

The mixer 64 includes a section of hollow pipe waveguide in which is inserted a crystal diode 66 after the manner of insertion of crystals 34 or 36 of Fig. 1. The modulation voltage from oscillator 14 is applied as a modulation voltage to one electrode of diode 66, the other electrode being grounded. The voltage from amplifier 20 is applied at one end of the waveguide section, and the output from the other end is applied to the line stretcher 28.

The operation of the arrangement of Fig. 4 is similar to that of Fig. 3 except that in Fig. 4*a* large carrier term results at the modulator output. Suppose that the system is set to operate at frequency $f-fm/2$. The components then available from the output of mixer 64 are at frequencies $f-fm/2$, $f+fm/2$, and $f-3fm/2$ and the oscillations may be sustained by passing through filter 29 only the component at $f+fm/2$, and suppressing the others. If the coherent reflection desired is at frequency $f+fm/2$ the mixer 66 output components are at $f+fm/2$, $f+3fm/2$, and $f-fm/2$, and the operation is sustained by passing at filter 29 only the component at $f-fm/2$. Again, in order to be certain that a single desired frequency is secured at the input or output of the gas cell 10, the filter 29 may be inserted at any appropriate point in the feedback path. The filter may precede or follow the mixer, and if a high pass filter is desired, a hollow pipe waveguide properly dimensioned may be employed, or the alternative two parallel path phase balance filter which may also be of hollow pipe waveguide, may be employed.

No mention has been made of the purpose of line stretcher 28. The phase of the voltage fed back to the input of the gas cell 10 is not critical insofar as sustaining oscillations. This lack of criticalness is because of the extreme sensitivity of phase with frequency of the field reflected by the gas of cell 10. In the arrangement of Fig. 1 or Fig. 4 the proper phase for sustaining oscillations is automatically reached by a slight shift in frequency. The frequency shift is slight because the change in phase due to change in path length is linear with change in path length and hence is comparatively insensitive with changing frequency, while the change in phase due to anomalous dispersion occurs entirely in the frequency interval defined by the narrow bandwidth line. Only if the feedback is barely sufficient to sustain oscillations, may the line stretcher 28 be required to adjust the feedback phase to sustain oscillations. However, the adjustment of phase by means such as the line stretcher 28 may also provide a very fine frequency adjustment. If this is to be done, however, the lower modulation frequency should also be closely stabilized.

It is apparent that the invention provides a novel means for producing sustained oscillations which does not require the employment of phase discriminators or the like, and which takes full advantage of the narrowness of the spectral line produced by a Dicke-Newell type gas cell.

What is claimed is:

1. A microwave generator comprising a gas cell having means for producing a periodic time and spatial modulating field, a modulation oscillator connected to apply energy at a frequency *fm* to said means, said cell having an input, means to apply energy to said cell at one frequency displaced from the molecular resonance of the gas by half the said modulation frequency *fm*, thereby to provide at the said gas cell output energy at another frequency displaced from the molecular resonance of the gas by $fm/2$, and a feedback path from said output to said input, said feedback path including a mixer and an amplifier, said modulation oscillator being coupled to said mixer to mix with the gas cell output.

2. A microwave generator comprising a gas cell having means for producing a periodic time and spatial modulating field, a modulation oscillator connected to apply energy at a frequency *fm* to said means, said cell having an input, and means to apply energy to said cell at one frequency displaced from the molecular resonance of the gas by half the said frequency *fm*, thereby to provide at the said gas cell output energy at another frequency displaced from the molecular resonance of the gas by $fm/2$, said means to apply energy including a feedback path from said output to said input, said path including a mixer and an amplifier, said modulation oscillator being connected to said mixer to mix with the energy from the said cell output, and the mixed energy component at said one frequency being applied to said input by said means to apply energy to said cell.

3. The generator claimed in claim 2, said amplifier being interposed in said feedback path between said gas cell output and said mixer.

4. The generator claimed in claim 2, said connection from said modulation oscillator to said mixer being a push-pull connection.

5. The generator claimed in claim 2, said mixer including a pair of modulating diodes, said connection from said modulation oscillator being to both said diodes with one phase of *fm* applied to one diode and reversed phase to the other diode.

6. The generator claimed in claim 2, said modulation oscillator connection to said mixer including one and only one output phase at frequency *fm*.

7. The generator claimed in claim 6, said mixer comprising a waveguide with a single diode, said modulation oscillator to mixer connection being to said diode.

8. The generator claimed in claim 2, further comprising a filter in the feedback path.

9. The generator claimed in claim 2, said filter being a hollow pipe waveguide high pass filter.

10. The generator claimed in claim 2, said filter being a parallel path filter.

11. The generator claimed in claim 2, said feedback path comprising a line stretcher.

12. The generator claimed in claim 11, said line stretcher being variable.

13. The generator claimed in claim 2, said means for producing a periodic time and spatial field comprising a series of planar grids positioned in said gas cell spaced a quarter wavelength apart at the gas resonance frequency, the connection of said modulation oscillator being to alternate grids whereby said grids reflect or re-radiate microwave energy at said another frequency.

References Cited in the file of this patent

UNITED STATES PATENTS

| | | |
|---|---|---|
| 2,584,608 | Norton | Feb. 5, 1952 |
| 2,602,835 | Hershberger | July 8, 1952 |